United States Patent [19]
Caldwell

[11] 4,194,301
[45] Mar. 25, 1980

[54] DEVICE FOR USE IN PAIRED ASSOCIATE LEARNING

[76] Inventor: Edward C. Caldwell, Box 147 - Rte. 7, Morgantown, W. Va. 26505

[21] Appl. No.: 904,540

[22] Filed: May 10, 1978

[51] Int. Cl.² .............................................. G09B 1/06
[52] U.S. Cl. ................................................... 35/9 R
[58] Field of Search ................. 273/273; 35/8 R, 9 R, 35/9 E, 9 F, 35 R, 35 H, 31 D, 31 F, 73

[56] References Cited

U.S. PATENT DOCUMENTS

| | | | |
|---|---|---|---|
| 2,681,804 | 6/1954 | Stover | 35/35 H X |
| 2,706,862 | 4/1955 | Fanning | 35/9 E |
| 3,347,549 | 10/1967 | Jackson | 273/273 |
| 3,464,124 | 9/1969 | Lynd | 35/35 H |
| 3,478,446 | 11/1969 | McCutcheon | 35/73 |
| 3,520,072 | 7/1970 | Greenwood | 35/35 H |
| 3,677,548 | 7/1972 | Hincz | 273/273 |

*Primary Examiner*—William H. Grieb
*Attorney, Agent, or Firm*—Shoemaker and Mattare

[57] ABSTRACT

A device for use in situations involving paired associate learning. The device includes a plurality of stimuli which are each removably positioned to be viewed through a viewing hole associated therewith, and a plurality of stimulus covers each removably positioned to cover a viewing hole. The stimuli are letters, letter combinations, numerals and numeral combinations, or the like. Reading, number concepts and mathematics can be taught using the device.

10 Claims, 4 Drawing Figures

U.S. Patent    Mar. 25, 1980    4,194,301
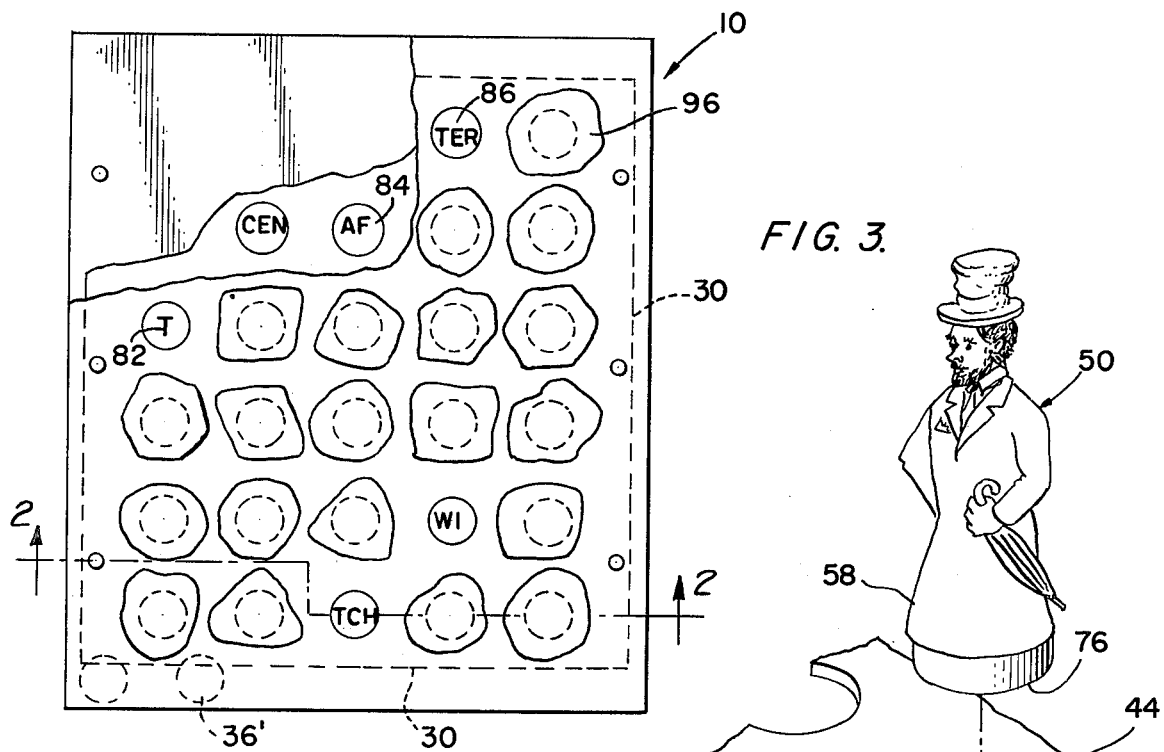
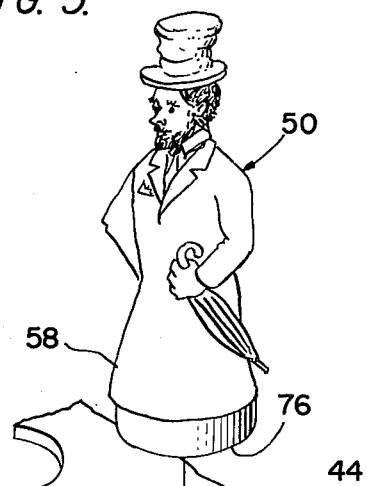
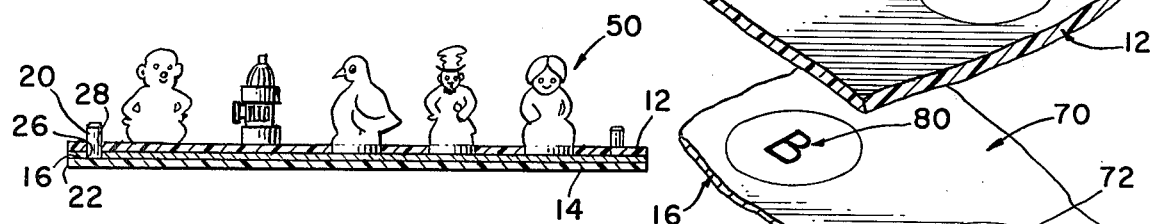
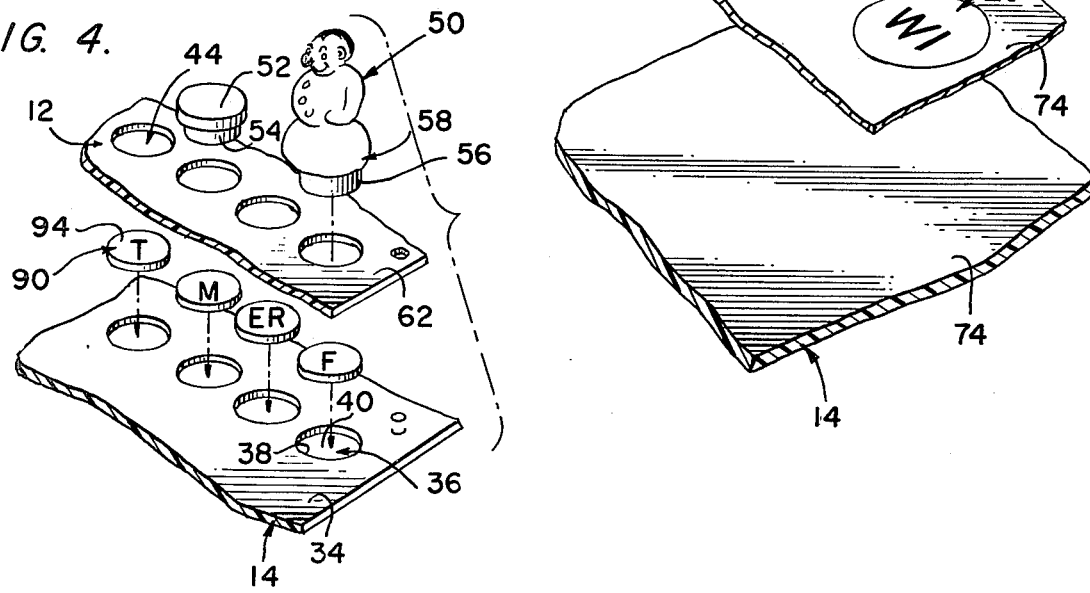

DEVICE FOR USE IN PAIRED ASSOCIATE LEARNING

BACKGROUND OF THE INVENTION

The present invention relates in general to teaching devices, and more particularly, to devices which are applicable to paired associate learning situations.

In teaching reading, selection of stimuli and the presentation thereof to the student are very important factors. Furthermore, the stimuli should be presented in a fashion conducive to being remembered by the student, so that the learning aspects thereof can be fully utilized. Thus, to be fully effective, a device used to teach reading should have appropriate stimuli which are presented in a fashion conducive to capturing and holding the attention of a student as well as conducive to being remembered by such student.

Such requirements are especially important if the student is a young child, as is often the case in teaching a reading skill. Heretofore, devices used to each reading to youngsters have failed to completely fulfill one or more of the above-stated requirements. Thus, for example, some devices involve games which merely require a player to match stimuli rather than to combine stimuli, and thus such devices fail to teach actual letter and letter group combinations. Other devices involve games wherein only single letters are used, and thus these other devices fail to provide the appropriate stimuli. Still other devices, either because of the complexity thereof or because of the selection of components, fail to capture and hold the attention of a young learner, and thus are not completely effective.

The inventor is aware of the memory game disclosed in U.S. Pat. No. 3,347,549 issued to P. S. Jackson on Oct. 17, 1967. The game disclosed by Jackson uses a rotatable disc for varying the symbols displayed through the multiplicity of openings. That is, the base, the playing surface and the stimulus surface are permanently fastened to each other, thus severely limiting the number and type of stimulus arrangements available for play. This in turn necessarily limits the functions of the game. Only 18 different stimulus arrangements are possible with the rotating disc—only 12 if one ignores the relative position of the sides of the game board.

While the game disclosed in the Jackson patent does require observation and memory skills, the game is not at all suitable for use as a device for teaching in a paired associates concept. For example, in learning reading, a student must be taught to respond to many different stimuli, rather than merely make a same-different judgment. In learning reading, a student must be taught to blend stimuli, rather than merely match same (vis-a-vis different) stimuli. The Jackson device requires a response only in a same-different context, and thus is not at all suitable for teaching reading skills, or other similar skills.

SUMMARY OF THE INVENTION

The device embodying the teachings of the present invention is used in situations involving paired associate learning, and particularly the teaching of reading, and provides stimuli which are carefully selected and presented in a manner which captures and holds the attention of a learner, particularly a young learner.

The device of the present invention includes a stimulus layer sandwiched between a base and a playing layer, or sheet, or playing surface. Stimulus covers fit into holes defined in the playing surface, but the upper part of each cover is larger than the hole in the playing surface. Thus, when the playing surface is removed from the base, the stimulus covers can remain in place on the playing surface, while a different set of stimuli are positioned on the base. The playing surface can be replaced onto the base to cover the stimuli.

The stimuli in one embodiment of the invention include a plurality of discs removably placed on the base beneath the covers. When a player can use a disc, that player is permitted to retain the disc. If a disc is not used, it remains in place on the base for future use. By being removably placed on the base, the discs can be used as record keeping means, or as feedback means. As a further embodiment, a record keeping device could be built into the base of the game by using two rows of 15¾-inch blind holes on each side of an enlarged base. The removable nature of the discs is therefore quite important in the context of both a pure game concept and a learning situation, as score can easily be kept in the game situation, and learning progress, successes, accuracy and errors can be determined by viewing the removed discs.

The game disclosed herein is an educational game employing a memory component such that it is challenging for adults and yet enjoyed and often won by children as young as four years of age. An essential feature of the game disclosed herein involves the combination of two or more stimuli in such a manner as to demonstrate knowledge of a particular skill or concept. The game can be used for teaching reading to children ranging in age from four years to thirteen years with considerable success.

The use of the present game in teaching reading typically involves combining two stimuli to form a word. The selection of appropriate stimuli for use in the game is an important aspect of the educational value thereof. The stimuli are single consonants, consonant blends, consonant digraphs, and higher-order units, called ngrams. The ngrams disclosed herein have been selected as a result of several years of basic research in reading involving an analysis of approximately 18,000 of the most frequently occurring words in the English language.

OBJECTS OF THE INVENTION

It is, therefore, a main object of the present invention to teach paired associate learning in a manner which is effective for all learners.

It is another object of the present invention to teach reading in a manner which is effective for all learners.

It is a further object of the present invention to teach paired associate learning while simultaneously encouraging the development of memory skills.

It is a specific object of the present invention to teach paired associate learning in a manner which is effective for young learners.

It is a still more specific object of the present invention to teach reading in a manner which is effective for young learners.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a plan view of a playing board embodying the teachings of the present invention.

FIG. 2 is a view taken along 2—2 of FIG. 1.

FIG. 3 is an exploded view of a game board showing one form of the invention disclosed herein.

FIG. 4 is an exploded view of a game board showing one form of a stimulus layer, and two forms of stimulus covers embodying the teachings of the present invention.

DETAILED DESCRIPTION OF THE INVENTION

Shown in FIGS. 1 and 2 is a playing board 10 comprising a top sheet, or playing surface 12, a bottom layer, or base 14, and a stimulus layer 16 sandwiched between the playing surface 12 and the base 14. The base has a plurality of upstanding pegs 20 mounted thereon near the peripheral edges 22 thereof, and the stimulus layer and playing surface each has peg receiving holes 26 and 28, respectively, defined therethrough in a position to receive the pegs 20 when the three elements are superposed as shown in FIGS. 1 and 2, with the base and playing surface being in edge-aligned relationship, and the stimulus layer having a peripheral edge 30 offset from the edges of the other two elements. The playing surface and stimulus layer are each removably positioned on the base so that, as will be discussed below, the stimulus sheet can be changed according to the particular learning situation, student, teacher, or the like. In one embodiment there are three pegs, each being 3/16 inches in diameter and protruding ⅜ inch above the top surface of the base.

As shown in FIG. 4, the base 14 has a top surface 34 and has a plurality of blind circular holes 36 defined therein. It is noted here that while a circular shape is disclosed herein for the holes, other suitable shapes can also be used without departing from the scope of the present invention. The holes are randomly arranged, and do not penetrate completely through the base so that each hole has a side wall 38 and a bottom surface 40. The playing surface 12 has a plurality of viewing holes 44 defined therein to be aligned with the blind base holes 36 when the playing surface is mounted on the base in edge aligned relationship therewith. The holes 36 and 44 are of the same dimensions to be superposed in the FIG. 1 configuration of the playing board 10.

A plurality of blind holes, such as holes 36' indicated in phantom lines on FIG. 1, can also be included on the base to receive stimulus discs which have been removed from the playing area. Using the holes 36', a record of the removed stimuli can be kept. As will be later discussed, a stimulus is not generally removed unless it is used by a player, and thus such a record can be used to determine score in a game situation or progress in a teaching situation. It is noted that only two holes 36' are shown in FIG. 1 in the interest of clarity; however, as many holes as are desired can be used. For example, a game board could include two rows of blind holes 36', each row having 15 holes therein. The game board would be larger than the board shown in FIG. 1 to have marginal areas in which the blind holes 36' are defined. For example, such a board would be approximately 12 inches by 15 inches. The blind holes 36' would be approximately ¾ inch in diameter and the stimulus discs removed during play are stored therein. In this embodiment, a total of 30 holes are located on each side of the board for a 30 stimulus game. However, other numbers can be used without departing from the scope of this disclosure. From one to four players can thus use this game. An example of a game would have a player assigned a corner of the board in which to store discs. The player then fills up the holes 36' in a direction toward the other corner of the board.

The device of the present invention is constructed with a base, a playing surface and a stimulus surface (or stimulus discs) all of which are readily detached from each other. The stimulus surface can be merely an appropriately marked sheet of standard notebook paper. The stimulus discs are either pre-marked or constructed of material that can be marked, erased and remarked. The construction of detachable elements (base, surface and stimuli) combined with the ease of producing various stimulus surfaces and discs gives a proposed game virtually unlimited flexibility of stimulus presentations and response requirements.

A plurality of viewing hole covers, or stimulus covers, such as playing pieces 50 or discs 52 are placed on the playing board to cover the viewing holes for a purpose to be discussed below. As shown in FIG. 4, the playing pieces can be child pleasing figures, or the like, whereas the discs 52 can be the usual form of a disc. In either event, the stimulus covers each should have a portion thereof which completely covers a viewing hole to block that viewing hole from sight when the piece is in position over the hole. Each disc can also have a base 54 which snugly fits into the viewing hole to retain the disc in position over the viewing hole. The playing pieces 50 each has a base 56 which has a dimension similar to each of the viewing holes, and a height sufficient so that the base extends far enough into the hole so that the piece 50 is securely held in position covering the hole even when the playing surface is moved. Each of the pieces 50 further includes an enlarged portion 58 adjacent the base thereof which has a dimension larger than the diameter of the viewing hole so that the hole is completely obscured when the piece is in position within the hole as indicated in FIGS. 1 and 2. It is also noted that the bases can be sized so that the piece 50 and discs 52 remain securely held in the holes during movement of the playing surface.

As seen in FIG. 4, each of the discs 52 has an outer diameter greater than the viewing hole diameter to completely obscure a hole when a disc is placed on top surface 62 of the top sheet, or layer, over a viewing hole.

The playing pieces are utilized when young children are using the playing board to hold the attention of such children, or when impairment of the manual dexterity of the user may inhibit the easy manipulation of the discs 52. In one embodiment of the present invention, the stimulus layer comprises a sheet of material, such as paper or other flexible material, which can be written on, and forms a stimulus sheet 70 as shown in FIG. 3. The stimulus sheet 70 has a plurality of stimulus areas 72 defined on the upper surface 74 thereof in positions to be aligned with the viewing holes when the sheet 70 and the playing surface are mounted in superposed relationship on the base 14 as shown in FIGS. 1 and 2. The stimulus areas are sized to correspond to the size of the viewing holes so that upon unblocking the viewing holes, the stimulus area is exposed through the viewing hole. In such a case, the top layer has a thickness sufficient, and the playing pieces have bases sufficiently long, to securely support the playing pieces in an upright orientation while lower surfaces 76 of the bases rest on the upper surface 74 of the stimulus sheet.

Each stimulus area has a stimulus indicia 80 contained therein. In the teaching of reading skills, the stimulus indicia, as will be fully discussed below, includes letters 82, letter combinations 84 and letter groupings 86. In teaching number facts, numbers and combinations thereof could be used. For example, number combinations such as 4+4, 5+5, 7+8, or the like could be used, and pure numbers such as 8, 10, 15, or the like could be used. All forms of arithmetic operations, concepts and techniques could be the subject of the stimuli as will occur to those skilled in the art. As will be fully discussed below, the stimulus indicia are selected for use with teaching techniques involving paired associate learning situations and are also selected to improve the memory skills of the players. The stimulus indicia thus includes selected stimuli each of which includes one of a plurality of associated components, such as letters in the reading situation, which are combinable to form responses, such as words in the reading situation.

As shown in FIG. 4, another embodiment of the stimulus layer of the present invention includes a plurality of stimulus discs 90 which are each sized to be received in the blind holes 36 defined in the base 14. The stimulus discs 90 correspond to the stimulus areas 72 and are each exposed upon uncovering a viewing hole, as above-discussed in reference to the stimulus areas. Each of the discs has a thickness corresponding to the depth of the blind holes so that top surfaces 94 of the discs are flush with the base top surfaces 34. As with the FIG. 3 embodiment, the playing pieces are sized to be securely held in the viewing holes with the lower surfaces 76 thereof resting on top of the disc top surfaces 94.

Illustrative of the in-use playing board 10, the FIG. 1 configuration indicates the covered viewing holes, and hence covered stimulus areas, by the view obstructing areas 96, and indicates the uncovered viewing holes, and hence the exposed stimulus surfaces, by showing general stimulus surfaces.

It is noted that the stimulus sheet can comprise a plain piece of notebook paper which has the stimulus areas defined by circles or lines, or other suitable markings. Notebook paper represents a convenient and inexpensive medium which enables a teacher to prepare stimuli which are tailored to the individual student, and the progress of such individual student at any particular session. Also, a multiplicity of discs, or even blank discs can be used, and proper stimuli can thus be selected according to the particular lesson, student, teacher, or the like. Thus, there is considerable flexibility in the playing board so that every player receives the fullest possible benefit therefrom.

While pegs have been shown, it is noted that other means of attachment can be used, and in fact, no attachment means is absolutely required. It is only important that the elements of the playing board be arranged so that upon uncovering a viewing hole, a stimulus area is exposed when desired. The pegs can be dowel rods, or the like, and can be situated and sized to accept the ring holes of the aforementioned notebook paper.

Preferably, the playing surface 12 is 9½ inches by 12 inches by ¼ inch, and contains 30 randomly arranged holes each being ¾ inches in diameter. It is here noted that the row-column formation of the holes shown in the drawings is merely for the sake of convenience, and any other suitable arrangement can be used as the situation dictates. Also preferably, the base is 12 inches by 15 inches by ½ inch, and the blind holes 36 are also ¾ inches in diameter, and are 1/16 inch deep. The stimulus discs are preferably ½ inch in diameter, and 1/16 inch thick. A preferred stimulus sheet is 8½ inches by 11 inches by 1/64 inch and the stimulus areas imprinted thereon are ¾ inch in diameter. It is here noted that preferably the stimulus sheet and the stimulus discs are not used simultaneously.

By varying the number of elements in a game that can be combined, the time required to complete a game can be varied. Thus, interest can be maintained for learners of varied capabilities. Consider the following abbreviated stimulus surfaces as an example:

Surface F:  b s b s end end ake ail;
Surface S:  b n c k ay ail ent ing.

A surface like F will result in a game that moves very quickly since all consonants can be combined with all ngrams to form words. The need of memory-for-location is minimal in such a game. With a surface like S, however, only the consonant b can be combined with more than one ngram to form a word. Thus, the game will take longer and memory-for-location will play a more significant role.

Having described the structure embodying the teaching of the present invention, the use of that structure will now be presented. For the sake of convenience, a 30-stimulus game, i.e., a game involving 30 holes, will be described; however, it is noted that the number of stimuli can be varied considerably, as can the arrangement thereof, according to the exigencies of any particular situation. The 30-stimulus game description is therefore not intended as a limitation.

A 30 stimulus game is played with 15 consonants and/or consonant blends and/or consonant digraphs and 15 ngrams such that when they are combined they form words, e.g., the consonant "m" and the ngram "ail" or the digraph "ch" and the ngram "per". These 30 stimuli can be located on a stimulus surface or on stimulus discs. If discs are used, they are inserted randomly in the holes in the base. If a stimulus sheet is used, it is placed between the playing surface and the base. In either case, the holes in the playing surface are covered with 30 objects such that the stimuli are not visible at the start of play. Thus, when play begins, the board contains 30 concealed stimuli. To start the play, a player (who has been selected according to any suitable procedure as the first player) removes two stimulus covers and determines if a word can be made from them. If no word can be made by the player, the player returns the covers to their original positions on the playing surface covering the viewing holes, and play passes to the next player. For example, if a player uncovered the stimuli "ch" and "m," since no word could be formed from them, the player would return the covers to their original places and that player's turn would end. If, however, a word can be made, the player keeps the covers. If stimulus discs are being used, then each time the player can form a word, the player removes the discs and places them in the record-keeping holes in the base so as to form the word. These discs serve as a record of the words each player has made during the game. By keeping such a record of their response, inexperienced players can be given feedback regarding the accuracy of their responses at the end of a game. A player can continue to uncover pairs of stimuli as long as that player can make words from each pair uncovered. For example, if a player uncovers "m" and "ain" and indicates that they make the word "main," the player keeps the covers and uncovers two more stimuli. If the next two uncovered stimuli were "ch" and "per," and the player indicated that these two made "perch," then these two covers would be kept by the player, and two more stimuli uncovered. This procedure would continue until a pair of stimuli were uncovered with which the player could not form a word. On every play, all players are allowed to observe the stimuli that are uncovered and the positions thereof, including those stimuli that are recovered. A memory component is thus introduced into the game by permitting use of covered stimuli. Players are thus encouraged to observe and be alert during each and every turn by all players, because even if a word is not made, a subsequent player may be able to use the stimuli he uncovers as well as any covered stimuli which he can recall.

The game can also be played by only one person. In the case of a solitary game, the player clears the board in as few plays as possible. The player may write the words formed on each turn so that they can be checked for accuracy. If the player cannot, or does not, wish to write the words, then the stimulus discs can be used and removed as a record of performance as described above.

It is to be noted that while stimulus surfaces are convenient and can be created to teach a variety of different combinations of consonants and ngrams and phonic rules, the stimulus discs are more flexible and allow for greater individualization. For example, if a learner were having difficulty decoding the letter "c," which has several different pronunciations as in "cent," "coal," "church," and "machine," the stimulus discs inserted in the holes could include several examples of all four pronunciations. Or, if a learner were having difficulty with similarly appearing and/or sounding stimuli such as "ack" and "ake" or "ail" and "ill," a game composed of those stimulus discs could be readily prepared.

A more complete list of applications of the game to reading is presented below. In addition to reading, the game can be used to teach number concepts, various elementary laws of mathematics, and concepts of multiplication and division. The game can be used in virtually any situation in which paired associate learning is involved.

Reading Applications

1. Matching single letters of low confusability: b, r, n, s.
2. Matching single letters of high confusability: b, d; n,u.
3. Matching ngrams of low confusability: ake, oy, est, cor.
4. Matching ngrams of high confusability: ake, ack; ail, ain.
5. Matching consonant blends and digraphs: bl, gh, th, br.
6. Matching whole words: the, is, in, who.
7. Match and give sound of selected consonants: m, t, r, h.
8. Match and give sound for consonant blends and digraphs: bl, gh, th, br.
9. Match and give sound for selected ngrams: ing, est, ake, ail.
10. Pair upper and lower case letters: A, a; B, b; C, c; D, d.
11. Pair single consonants and ngrams to form words: b, ake; m, ail; r, an; p, est.
12. Pair consonant blends or digraphs and ngrams: br, ake; sn, ail; ch, est; per, ch.
13. Pair single letters and two or more units to form multisyllable words: s, ing, er; t, est, ing; ent, er, tain.
14. Pair single units and two letters to form words: g, oa, t; b, ike, s; w, i, tch.
15. Pair single consonant blends of digraphs with two units to form multisyllable words: ch,art, er; th, ick, er; tr, ack, ing.
16. Pair single letters with units of more than one pronunciation: d——s, ay; b——n, ee; s——s, ay; c——, ow; kn——, ow.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An educational device for use in paired associate learning situations, comprising:

a base;

a top sheet having a plurality of viewing holes defined therein and being removably positioned on said base, said base having a plurality of blind holes defined therein to be aligned with said top sheet viewing holes;

a plurality of stimulus discs removably held in said base blind holes, said stimulus discs including selected stimuli located thereon to be aligned with individual viewing holes of said plurality of viewing holes and visible through said individual holes, said selected stimuli on said stimulus discs each including one of a plurality of associated components, a component on one disc being combinable with a component on another disc to form a selected unit used with teaching techniques involved in paired associate learning situations; and a plurality of stimulus covers releasably mounted on said top sheet to cover said viewing holes and prevent viewing therethrough so that viewing of said selected stimuli via said viewing holes is prevented by said viewing hole covering stimulus covers, said stimulus covers each being removable from a viewing hole covering position to expose a selected stimulus aligned with such uncovered viewing hole so that removal of a plurality of stimulus covers exposes components involved in paired associate learning situations.

2. The educational device defined in claim 1 wherein said selected stimuli include single consonants.

3. The educational device defined in claim 1 wherein said selected stimuli include single vowels.

4. The educational device defined in claim 1 wherein said selected stimuli include consonant blends.

5. The educational device defined in claim 1 wherein said selected stimuli include consonant digraphs.

6. The educational device defined in claim 1 wherein said selected stimuli include ngrams.

7. The educational device defined in claim 1 wherein said paired associate learning situation includes teaching techniques involved in teaching reading.

8. The educational device defined in claim 1 further including fastening means on said base for connecting said top sheet to said base.

9. The educational device defined in claim 1 wherein said stimulus covers include a plurality of child-appealing figures.

10. The educational device defined in claim 1 wherein said stimulus covers include a plurality of discs.

* * * * *